United States Patent [19]

Rouverol

[11] Patent Number: 4,651,588
[45] Date of Patent: Mar. 24, 1987

[54] LOW-EXCITATION GEARING

[76] Inventor: William S. Rouverol, P.O. Box 9122, Berkeley, Calif. 94709

[21] Appl. No.: 835,273

[22] Filed: Mar. 3, 1986

[51] Int. Cl.$^4$ .............................................. F16H 55/06
[52] U.S. Cl. .................................................. 74/462
[58] Field of Search ...................... 74/462, 460, 459.5, 74/409, 443; 29/159.2, 159 R

[56] References Cited

U.S. PATENT DOCUMENTS

| | | | |
|---|---|---|---|
| 1,525,646 | 2/1925 | Cox | 74/462 |
| 1,813,875 | 7/1931 | Fehr | 29/159.2 X |
| 1,825,621 | 9/1931 | Cox | 74/462 |
| 2,760,381 | 8/1956 | Pickles | 74/460 X |
| 3,192,786 | 7/1965 | Stott | 74/462 |
| 3,606,782 | 9/1971 | McNabb et al. | 29/159.2 X |
| 3,881,364 | 5/1975 | Rouverol | 74/462 |
| 3,982,444 | 9/1976 | Rouverol | 74/462 |
| 4,108,017 | 8/1978 | Rouverol | 74/462 |
| 4,259,875 | 4/1981 | Rouverol | 74/462 |
| 4,276,785 | 7/1981 | Rouverol | 74/462 |
| 4,589,300 | 5/1986 | Rouverol | 74/460 |

FOREIGN PATENT DOCUMENTS 521076 7/1921 France .
297689 9/1929 United Kingdom .
1195718 6/1970 United Kingdom ................ 74/462

OTHER PUBLICATIONS

American Gear Manufacturers Association, Standard 218.01, Dec. 1982.
AGMA, Technical Paper No. 85FTM12, *Minimizing Gear Noise Excitation*, by Nielsen et al. Oct. 1985.

Primary Examiner—Cornelius J. Husar
Assistant Examiner—Anthony Knight

[57] ABSTRACT

The invention discloses means to reduce the noise and vibration of gear sets by (a) minimizing the transmission error resulting from variations in the mesh stiffness at different phases of tooth engagement and (b) reducing the maximum rate at which load is transferred to the driven gear. A substantially constant mesh stiffness is achieved by shaping the teeth and the field of contact so the product of incremental tooth contact line length and tooth pair stiffness per unit length of tooth contact line integrated over the field of contact does not vary significantly as the tooth contact lines move across the field of contact. In addition, the maximum rate at which load is transferred to the driven gear is substantially reduced by shaping the teeth so the tooth contact lines intersect the entry and exit boundaries of the field of contact at an angle.

30 Claims, 18 Drawing Figures

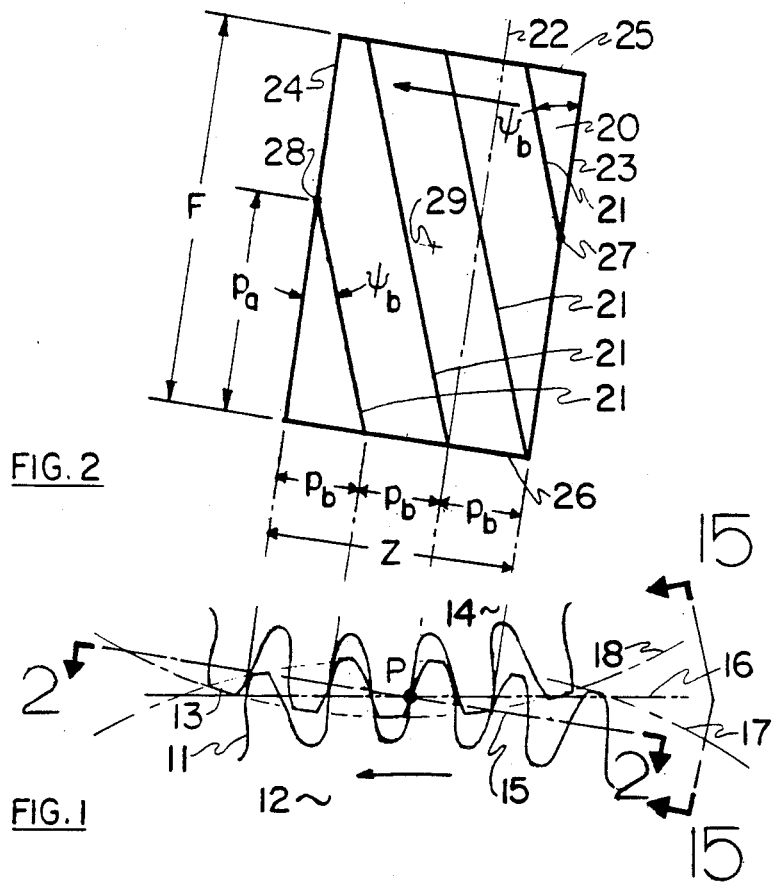
FIG. 2
FIG. 1
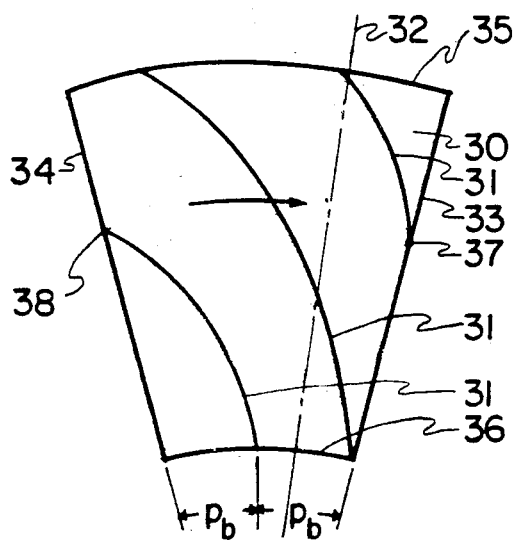
FIG. 3
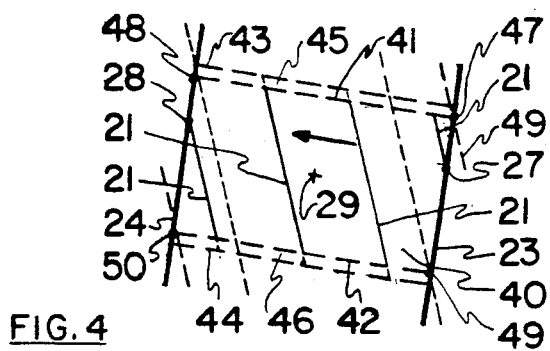
FIG. 4

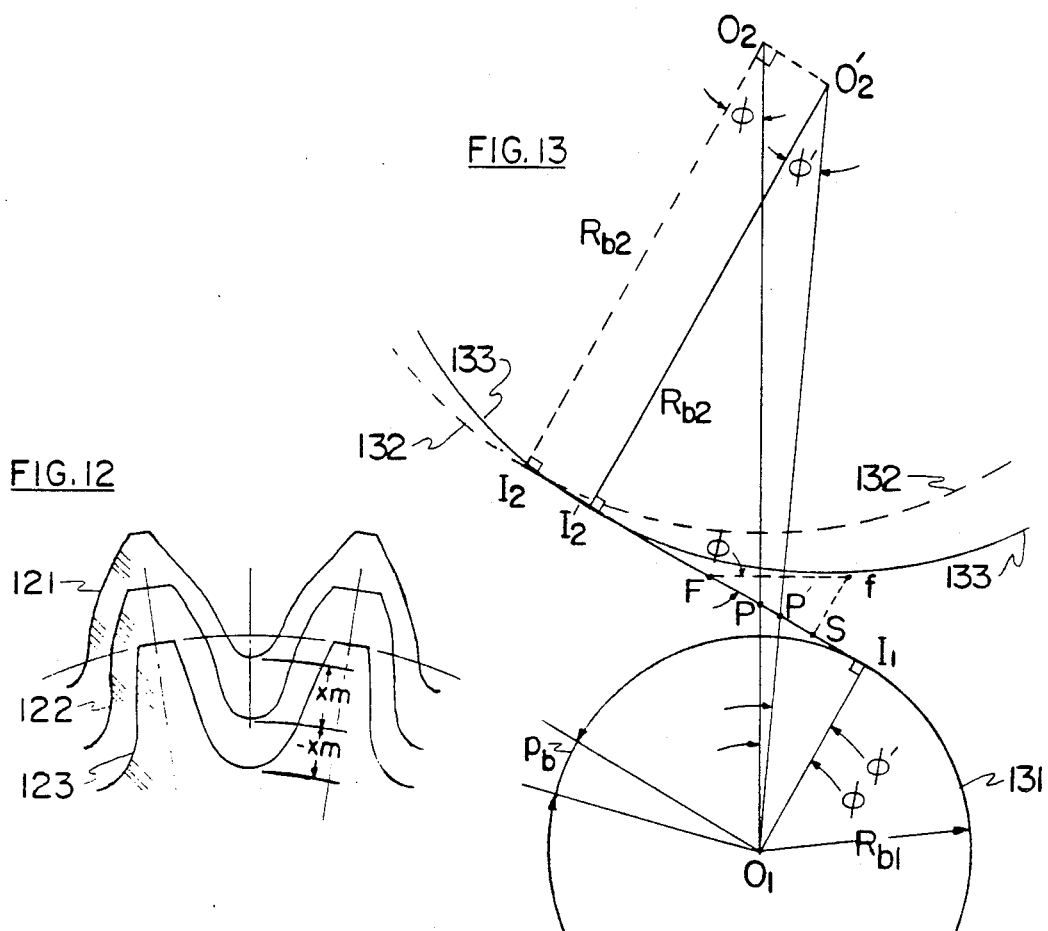
FIG. 13
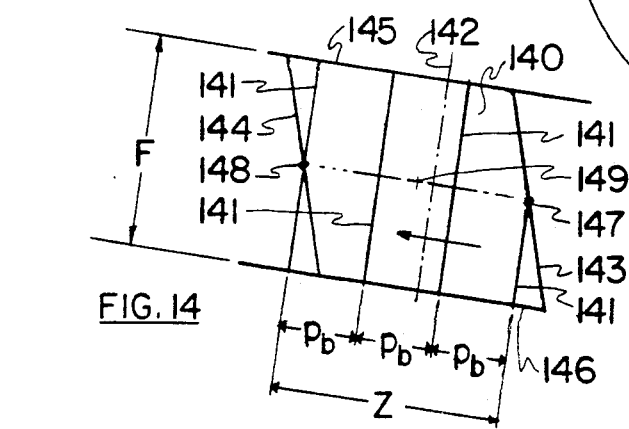
FIG. 12
FIG. 14
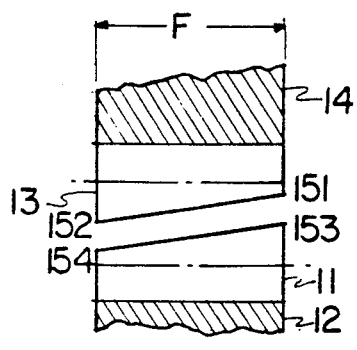
FIG. 15
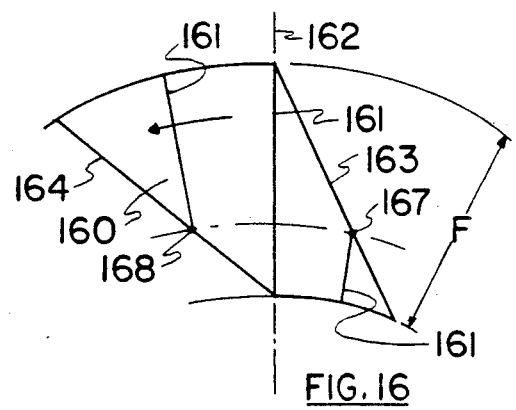
FIG. 16

LOW-EXCITATION GEARING

This invention relates to the shape of gear teeth. Specifically it relates to the utilization of particular gear tooth features that will minimize operating noise and vibration. The invention comprises additions to and improvements on U.S. Pat. Nos. 4,276,785 and 4,589,300, U.S. patent application Ser. No. 757,350 still pending, and U.S. patent office disclosure document No. 134,916.

Power transmission gearing having straight teeth (spur or straight bevel gearing) operates typically with three to five times as much noise and vibration as gearing with helical or spiral bevel teeth of equal manufacturing accuracy. This is because conventional spur or straight bevel gears have a transverse (or "profile") contact ratio of 1.3 to 1.7, so that as the gears turn the number of tooth pairs in engagement alternates between one pair and two pairs, and this produces a plus-or-minus mesh stiffness variation of approximately 30% from the mean mesh stiffness. Since mesh stiffness variation translates directly into transmission error, which is one of the main sources of gear noise and vibration, conventional straight-tooth gearing is not generally found to run very smoothly, especially at high speeds.

A further reason for the rough running of conventional straight-tooth gearing is that all of the transmitted load is transferred onto or off of the tooth very abruptly, rather than gradually as in the case of helical or spiral bevel gears. In fact even helical or spiral bevel gearing may operate with substantial noise and vibration if the gears have a combination of light load and misalignment (or lead error) so that only a portion of the tooth length is engaged and the gearing consequently functions more-or-less in the manner of spur or straight bevel gearing, without the smoothing effect of tooth overlap.

The prior art includes examples of gearing designed to reduce mesh stiffness variation: U.S. Pat. Nos. 1,525,642, 1,825,621 and 3,982,444. These patents suggest that constant mesh stiffness can be attained by specifying proportions for the field of contact that cause the aggregate length of the tooth load lines to remain constant. However such field configurations are not in themselves sufficient to produce constant mesh stiffness because they do not take into account either variations in tooth pair stiffness in the direction of moton or the effects of tooth crowning and profile relief. To achieve constant mesh stiffness, the product of incremental tooth contact line length and tooth pair stiffness per unit length of tooth contact line integrated over the field of contact must be substantially constant as the tooth contact lines move across the field of contact. Accordingly, a major object of the invention is to disclose special tooth features that afford a substantially constant mesh stiffness not only for helical or spiral bevel gears, but spur and straight bevel gears as well. To a great extent, the invention seeks to disclose the additional or alternative features needed to achieve the stated objectives of the abovementioned patents more effectively.

A second object of the invention is to minimize the rate at which load is transferred onto or off the teeth. This requires two special features, one being the minimization of the load per unit length of contact line, which is achieved by using the largest practical transverse contact ratio, and the other being the forming of the teeth so they enter the field of contact gradually or progressively, rather than all at once. In a gear that has straight teeth, such as a spur or straight bevel gear, this gradual engagement characteristic can be achieved only if the entry and exit boundaries of the field of contact make an angle with the tooth contact lines. Prior art patents that include the second of these two special features, but not the first, are U.S. Pat. No. 3,982,444, FIGS. 10, 11, 12, and 13; U.K. Pat. Nos. 297,689 and 1,195,718; and French Pat. No. 521,076.

A third object of the invention is to supplement the disclosure of U.S. Pat. No. 4,589,300 which shows means for reducing mesh stiffness variation in gear pairs that are subject to misalignment and lead error. The disclosures of the present specification have as an object the showing of means not only to reduce mesh stiffness variation in such gear pairs, but to effectively eliminate it.

The above-mentioned and other objects and advantages of the invention will be evident from the drawings as explained in the specification that follows:

FIG. 1 is a partial side view of a pair of mating gears embodying the invention taken perpendicularly to the common pitch element (i.e., "transversely") and showing mating helical teeth meshed along a path of contact.

FIG. 2 is a view in the direction of 2—2 of FIG. 1, showing the lines of contact between the mating helical teeth and the field of contact across which these lines move.

FIG. 3 is a view of a field of contact such as shown in FIG. 2 but for a spiral bevel gear pair instead of a helical gear pair.

FIG. 4 is a view showing how the field of contact of FIG. 2 is reduced in width when the torque load being transmitted by the gears of FIG. 1 is reduced.

FIG. 12 is a partial transverse section of typical gear teeth showing how the tooth proportions that govern tooth stiffness are affected by rack shift or equivalent dissimilarities in the pinion and gear hob.

FIG. 13 is a diagram showing the geometrical construction employed to calculate the operating center-distance for a pair of parallel-axis gears embodying the invention.

FIG. 14 is a view in the direction 2—2 in FIG. 1, showing the lines of contact between mating spur teeth embodying the invention and the skewed or parallelogram field of contact across which these lines move.

FIG. 15 is a partial section in the jogged direction of 15—15 of FIG. 1, showing the variation of the effective height in the lengthwise direction of spur teeth embodying the invention. (The helical teeth of FIG. 1 do not have this variation, since they have an addendum surface that is cylindrical.)

FIG. 16 is a view similar to that of FIG. 14 but showing the shape of the field of contact if the gears are straight bevel instead of straight spur.

Figure 5:
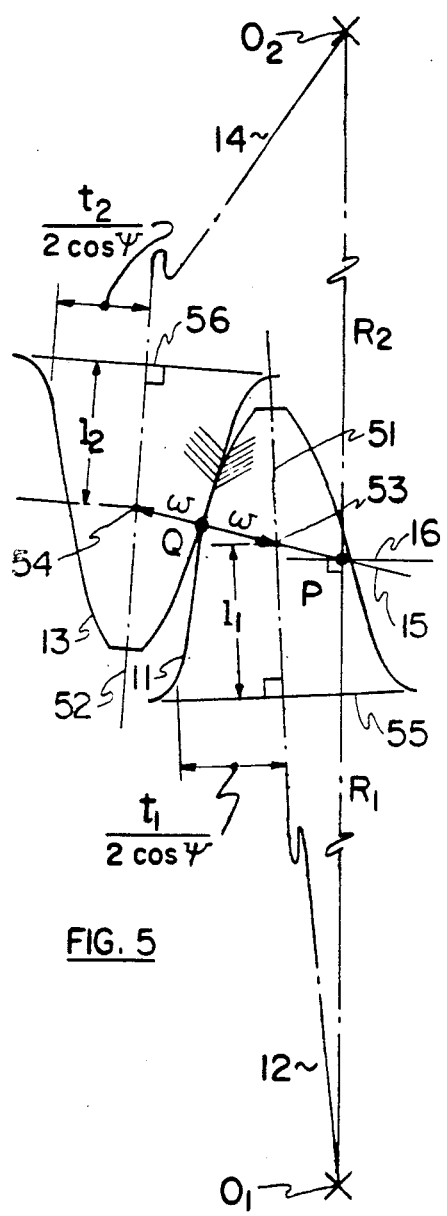
FIG. 5 is a transverse sectional view of a pair of engaged teeth of the gears of FIG. 1 enlarged to show the tooth proportions used in calculating tooth pair stiffness.

In detail and referring to the drawings, in FIG. 1 typical teeth 11, 13 are shown in the transverse direction (direction of motion). Teeth 11 are on the smaller gear 12 (pinion) and teeth 13 are on the larger gear 14. Teeth 11 and 13 make contact along a path line 15 of length Z. The end view of the common pitch element (line 22 in FIG. 2) appears as point P, the pitch point. The common tangent, line 16, which is the line tangent to the operating pitch circles at the pitch point, is also shown, as are the addendum circles 17, 18 of the pinion 12 and gear 14, respectively. Other parts of pinion 12 and gear 14, such as hubs, webs, rims, keyways, etc., are standard and are omitted in the interest of clarity.

FIG. 2 is a section through FIG. 1 in the direction of 2—2 showing the field of contact 20 that is the area locus of lines of contact 21 between mating teeth 11, 13. The field of contact 20 has end boundaries 23, 24 that are the loci of points at which the addendum circles 17, 18 intersect the path of contact 15 in each transverse plane. The field of contact 20 also has side boundaries 25, 26 that are spaced-apart by the effective face width F when the gears 12, 14 are transmitting full torque. The lines of contact 21 furthest from the centroid 29 of the field of contact 20 meet the end boundaries 23, 24 of the field of contact 20 at meeting points 27, 28 and make with those boundaries an acute angle greater than 5° as a minimum and preferably greater than 10°. In the case of helical gear sets, this angle corresponds to the base helix angle $\psi_b$. As the mating gears 12, 14 turn, the lines of contact 21 move across the field of contact 20, so that the meeting points 27, 28 continually move either up or down the end boundaries 23, 24 depending on the direction of rotation. The axial pitch $p_a$ has no special relation to the effective face width F.

FIG. 3 shows a field of contact 30 for a pair of spiral bevel gears embodying the invention. In this figure, all the elements correspond to those of FIG. 2 but are identified by numbers that are ten digits higher than the equivalent elements of the helical gear pair field 20 in FIG. 2; that is to say, the lines of contact are numbered 31 instead of 21, the left-hand end boundary is 34 instead of 24, and so on. It should be noted that in a bevel gear field of contact 30 such as shown in FIG. 3, the base pitch $P_b$ increases with distance from the pitch cone apex point (not shown), which would be the point where extensions of lines 32, 33 and 34 would meet. The length of the field 30 of FIG. 3 in the transverse direction (direction of motion) is two transverse base pitch lengths $p_b$ rather than the three shown in FIG. 2. (The reverse could just have well been the preferred design.)

FIG. 4 shows the central portion of the field of contact 20 of FIG. 2 as it would appear if the torque load transmitted by the gears 12, 14 was substantially less than full load torque. Because the teeth of gears embodying the invention are crowned in their lengthwise direction, only their central portions carry load when the torque is light. Because the tooth profiles do not have relief in the transverse direction, but are instead mathematically conjugate throughout their entire active portions, the end boundaries 23, 24 remain the same. The side boundaries, on the other hand, move inward to positions such as 41, 42 that are intermediate between the outermost positions 25, 26 in FIG. 2 and the centroid 29 of the field of contact.

If the torque load that produces the field of contact bounded by lines 23, 41, 24 and 42 in FIG. 4 is increased by a small increment, then the side boundaries move out to positions 43 and 44, and incremental strips 45, 46 lying between lines 41 and 43, and 42 and 44, respectively, are added to the field. If it may be assumed that prior to this incremental increase in torque load the variation in mesh stiffness was negligibly small, then each of these thin strips (or "incremental field elements") 45, 46 must also have substantially zero mesh stiffness variation if they are not to cause the mesh stiffness variation of the enlarged field to be other than zero. This leads to the basic precept that determines whether the stiffness of an entire mesh will be constant regardless of what torque is being transmitted: For a field of contact between mating gears to have a mesh stiffness that does not vary as the gears rotate, every incremental field element or strip 45, 46 in a direction in which the tooth working surfaces are not relieved must make a contribution to the total mesh stiffness that also does not vary as the gears rotate.

As noted in U.S. Pat. No. 4,589,300, there are two basic methods of reducing gear mesh stiffness variation. One involves making the face (axial) contact ratio integral, employing no crowning, and making the teeth as flexible as possible so the effects of misalignment are minimized. The second method, with which the present specification is concerned, involves making the profile (transverse) contact ratio integral and employing crowning but no transverse profile relief. To make this second method of dealing with mesh stiffness variation as effective as the first one is when misalignment is small, special proportions must be given to the teeth, and it is the disclosure of these special proportions that constitutes the subject matter of the present specification.

In applying the invention to the design of a gear set, it will usually be found advantageous to select gear tooth proportions that give a profile (transverse) contact ratio that is larger than the face (axial) contact ratio. This is because it is an essential condition for achieving "load synchronization" for the full field of contact 40 in FIG. 4. What is meant by "load synchronization" may be seen by noting the position of the four broken lines that pass through the corners 47, 48, 49, 50 of the field of contact 40. These broken lines represent the positions that tooth contact lines such as 21 will occupy at the beginning and end of the tooth loading and unloading phases. Loading of a tooth starts when a contact line passes point 47 at the upper right corner of the field 40. After passing point 47 the length of this contact line lengthens until it reaches point 49 at the lower right hand corner of the field 40. The length of this contact line then remains constant, and the load it transmits increases very slowly until it reaches the centroid 29, then decreases equally slowly until point 48 is reached. There the line then starts to shorten rapidly (unloading of the tooth) until the point 50 is reached and the line leaves the field.

The meaning of "load synchronization" will then be evident. If the length of the field 47–48 (or 49–50) is an integral number of transverse base pitch lengths, then there will be one tooth pair that is being loaded up during the interval of time taken for its line of contact to move from field corner 47 to field corner 49, and this loading up interval will be exactly in phase with the unloading of another tooth pair as its line of contact moves from field corner 48 to field corner 50. The triangular loading and unloading areas of field 40 are thus diagonally opposite each other and are so spaced that the angular impulse produced by the loading of one tooth pair is exactly annulled by an oppositely directed angular impulse produced by the simultaneous unloading of another tooth pair. This "synchronization" of tooth loading and unloading is so effective for reducing noise and vibration that substantial improvement is obtained even when the profile contact ratio (i.e., the ratio of the operating length of the path to the transverse base pitch) differs from an integer by as much as 0.10 or in some cases 0.15.

Referring next to FIG. 5, this is a transverse section of a single pair of teeth 11, 13 of FIG. 1, enlarged to show the tooth characteristics that govern tooth flexibility. Typically a pair of teeth 11, 13 are in contact at a point Q on the path of contact 15. For the general case, point Q is displaced from the pitch point P, which is on the line of centers $0_1 0_2$ as well as on the path of contact 15. For the tooth position shown in FIG. 5, the load w exerted on the driven tooth 13 by the driving tooth 11 lies on a straight line containing points P and Q that intersects the tooth centerlines 52, 52 at points 53 and 54, respectively. The distances $l_1$, $l_2$ from points 53 and 54 to the base lines of the teeth 55, 56, respectively, govern the flexibility of each of the teeth 11, 13. The component of load w normal to each of the tooth centerlines 51, 52 produces bending and shear deformation in both teeth 11, 13. Other smaller deformations include the Hertzian local deformation at the point Q and the radial deformation produced by the radial component of load w. Like the deformations produced by the friction force at Q, these latter two deformation components are small enough to be neglected in all except the most critical applications.

Tooth bending deflection varies almost exactly with the cube of the effective tooth loading height ($l_1$ and $l_2$ in FIG. 5) and shear deflection varies as the first power of these heights. The combined deflection produced by bending plus shear is something in between a first power curve (i.e., a straight line) and a cubic, as indicated by curves 61 and 62 in FIG. 6. This figure plots the single tooth deflection per unit load for a set of standard 20°-involute spur gears. It will be noted in FIG. 6 that the deflection of the gear tooth shown by curve 62 is slightly smaller at the start of contact (S) than that for the pinion tooth (curve 61) at the end of contact (F). This is because standard involute gears have a standard addendum coefficient of 1.0 and, for full fillet teeth, a standard dedendum coefficient of 1.4. For teeth of equal pitch line thickness, the tooth deflection for unit tip load is greater for small tooth numbers than for large because small pitch circles increase the amount of trochoidal action and reduce the tooth flank thickness. In other words, if there is no rack shift, the pinion teeth of standard involute gear pairs will always be more flexible than the gear teeth.

The total deflection of a pair of engaged teeth in the direction of the contact path is the algebraic sum of the deflections for the pinion and gear curves 61 and 62 respectively. This sum is generally called the tooth pair deflection or "tooth pair compliance" and its reciprocal is called the "tooth pair stiffness." It will be evident from curve 63 of FIG. 6 that the tooth pair stiffness varies substantially depending on where a particular contact line, such as 21 in FIG. 2, is situated in the field of contact 20. In addition, if the teeth are helical, the stiffness varies along the length of the contact line 21 according to distance from the low point of curve 63 in FIG. 6. In the case of spur gears this distance is uniform for the entire tooth, so a graph such as curve 63 of FIG. 6 may be used to obtain an exact value of tooth pair stiffness for any given set of contact lines such as shown in FIG. 14, subject to a correction which will be explained below. In the case of helical gearing, the tooth pair stiffness curve 63 may be considered sufficiently accurate for most purposes only in the central portion of field 20; but as in the case of spur gearing, curve 63 must be corrected in the vicinity of the end boundaries 23 and 24 of FIG. 2.

The reason why stiffness curves for spur gear teeth may be considered accurate for narrow transverse elements of helical gears is that the pairing of teeth tends to cancel out errors. If helical teeth are viewed in a direction normal to the tooth surface, the contact line will be seen to make a slight angle, called "the angle of inclination," with a line on the tooth surface that represents the intersection of the tooth surface and the pitch surface. But if this contact line slopes toward the tips of the teeth on one of a pair of mating gears, it must slope toward the roots of the teeth on the mate. For gear embodying the present invention, the angle of inclination is very small, in the range of 3° or 4°, and the slight increase in compliance that is produced by inclination of the contact line toward the tooth tip is essentially offset by the decrease in compliance produced by inclination toward the tooth root in the mating gear. It is for this reason that FIG. 6 may be considered to apply to helical gears as well as spur gears, at least in the central portion of the graph. There will of course be a scale change of the ordinates to take account of the fact that the load per unit length of tooth is increased by the secant of the base helix angle, as is the transverse deflection relative to the normal deflection. Consequently tooth stiffness in the transverse direction declines as the square of the cosine of the base helix angle..

It has been noted that tooth pair deflection curves for spur gears (curve 63 of FIG. 6) may be used to determine tooth pair deflections for helical gears in the central portion of the field of contact (20 in FIG. 2, 40 in FIG. 4). At the end boundaries of the field, however, (23, 24 in FIGS. 2 and 4), a substantial correction must be made to take account of what is called "buttressing." It will be seen in FIG. 2 and 4 that the outermost contact lines 21 intersect the end boundaries 23, 24 at points 27, 28 respectively. Beyond those points the teeth of course continue but the contact lines 21 have run off the tips or active flanks of the teeth, so no further load can be applied to the teeth beyond points 27 and 28. The effect of this is to greatly stiffen the teeth at and just inside the end boundaries 23, 24.

Figure 6:
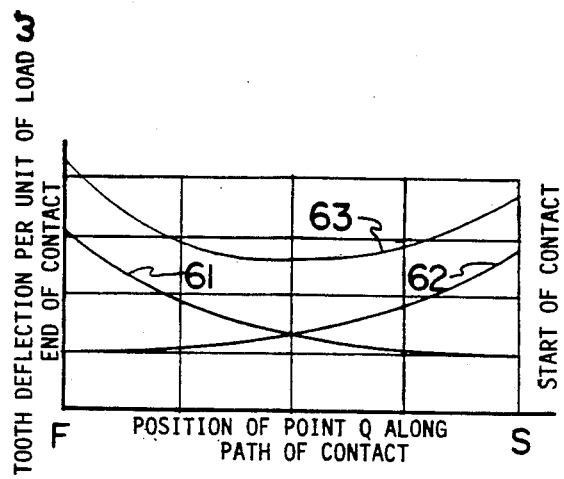
FIG. 6 is a graph of tooth deflection plotted against distance along the path of contact for a typical standard involute gear pair.
Figure 7:
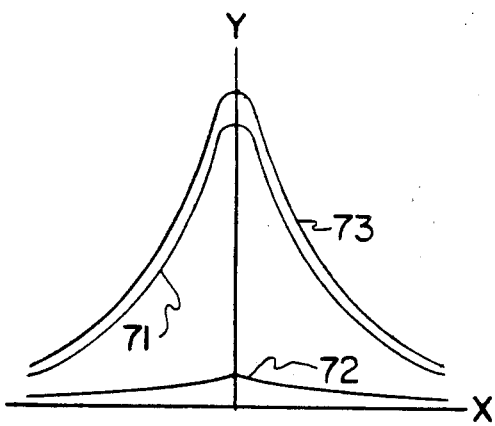
FIG. 7 is a set of curves showing the deflections produced by a concentrated load applied at the tip of a gear tooth and also at the flank of the mating tooth, together with a curve showing the sum of these two curves.

To calculate the magnitude of the buttressing effect that must be applied to curve 63 of FIG. 6 to make it applicable to helical gearing throughout its length, there are a number of analytical procedures available. The most accurate of these involves the use of the Finite Element Method ("FEM") to obtain the tooth deflections. For the purposes of the present specification, however, a simpler approach will be described that is accurate enough for most applications. It consists of an adaptation of what is known to gear engineers as the "moment image" method, and might be appropriately termed a "deflection image" method. The first step is to utilize any of the various known procedures described in the published literature on gear tooth deflection analysis to calculate and plot the deflection of the tooth tip, as for example curve 71 in FIG. 7, in response to a discrete concentrated unit of load applied to the tooth tip, and that of the mating tooth flank (curve 72) in response to the same load. The sum of the ordinates of these two curves is the total deflection (curve 73) at the point in question. (It should be noted that in the interest of clarity, FIG. 7 is plotted to a much larger scale than FIG. 6. Also local concavity under a concentrated load is ignored, for reasons that will become evident.)

Figure 8:
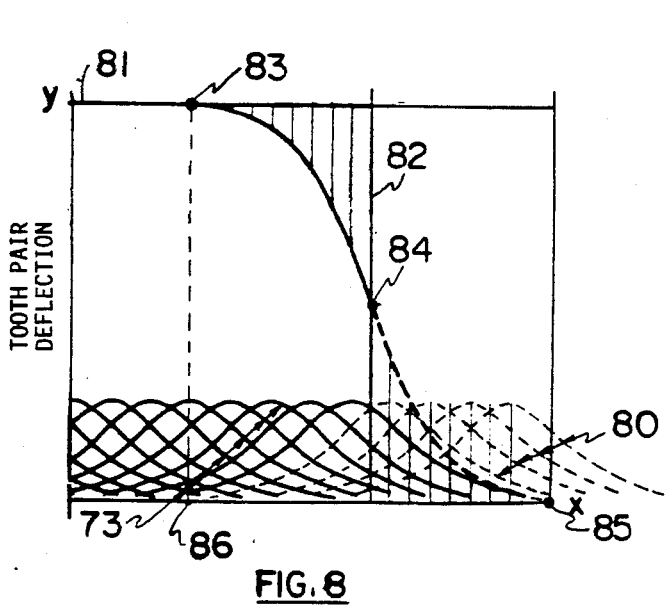
FIG. 8 is a graph that plots the superimposed deflections of a series of concentrated loads applied to a gear tooth to simulate the effect of a distributed load.

In order to simulate the actual distributed loads that are represented by the contact lines 21, evenly spaced concentrated loads having magnitudes determined by their spacing are superimposed and the deflections each one produces are plotted and summed, as shown in FIG. 8. The solid curves 73 represent deflections produced by the equally spaced concentrated loads that are exerted on the mating teeth; the sum of the ordinates for the several curves 73 at a given position x along the length of the tooth pair is shown as the total deflection curve 81.

FIG. 8 also shows a set of curves drawn with broken lines because the concentrated loads that would produce their contributions to the total deflection curve 81 are nonexistent because they are beyond the end boundaries of the field of contact (23, 24 in FIGS. 2 and 4). The line that demarcates the point (27 or 28) where the contact lines 21 reach an end boundary (23 or 24) is shown in FIG. 8 as line 82. It will be seen in FIG. 8 that the broken line curves 80 extend inside line 82, so that when the ordinates are summed at positions beyond the point 86 where the broken curves have a significant ordinate y, the deflection curve 81 begins to drop off, giving a summation value at point 84 where the line 82 is crossed that is exactly half that of the uncorrected deflection curve 81. The difference in ordinates between an extension of the curve 81 and the curve segment 83-84 is called the "buttress correction" and it is the polar symmetrical image of total deflection curve segment 84-85 which is obtained by summing the ordinates of those portions of the solid curves 73 that lie to the right of the line 82. This is why this type of analysis is called a "deflection image" analysis.

When the buttress correction curves for standard 20°-involute teeth (curves 90 in FIG. 9) are subtracted from the total deflection curve for spur teeth 63 (see FIG. 6), the corrected total deflection curve 91 becomes reasonably accurate for helical teeth at a corresponding position in the field of contact, that is to say, when the contact line for the helical tooth pair contains the midpoint of the contact line for the assumed spur tooth pair. The curve 91 has two serious disadvantages, however: Because the tooth pair deflection 93 for spur gears at the start of the path of contact (S) is smaller than that 97 at the finish of the path (F), the corresponding values 92,98 for the helical gear curve, which as noted above are exactly half as large as those for equivalent spur teeth, will also be unequal. As a result, the greater smoothness of operation obtained from synchronizing the loading and unloading of the teeth, by use of an integral profile contact ratio as noted above, is largely vitiated. To obtain the full benefits of load synchronization, it is of course essential that the load per unit length of contact line 21 (which is proportional to the tooth pair stiffness and inversely proportional to the tooth pair deflection under unit load) be the same at point 92 as it is at point 98. This insures that the load assumption rate will be exactly the same as the load shedding ratio.

Figure 9:
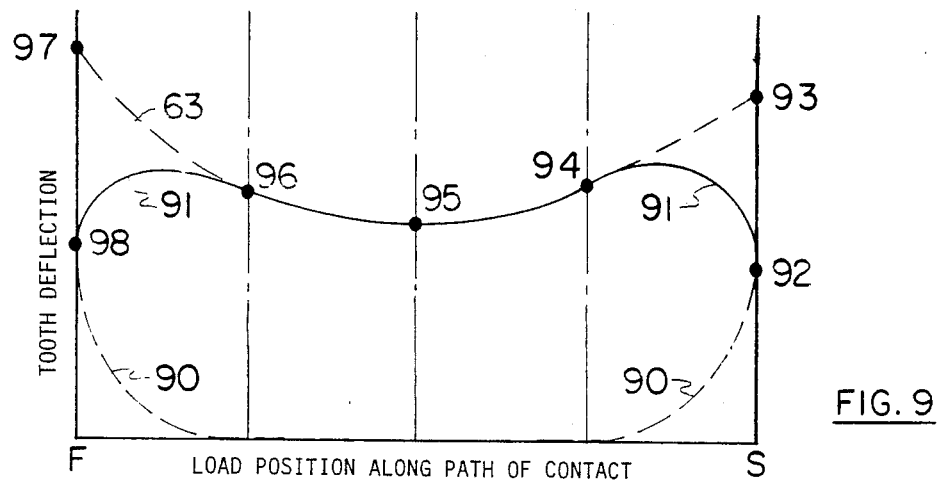
FIG. 9 is a graph that plots tooth pair deflections at various points along the path of contact, showing how the deflection of spur teeth must be corrected in the vicinity of the end boundaries of the field of contact if helical gearing is being analysed.
Figure 10:
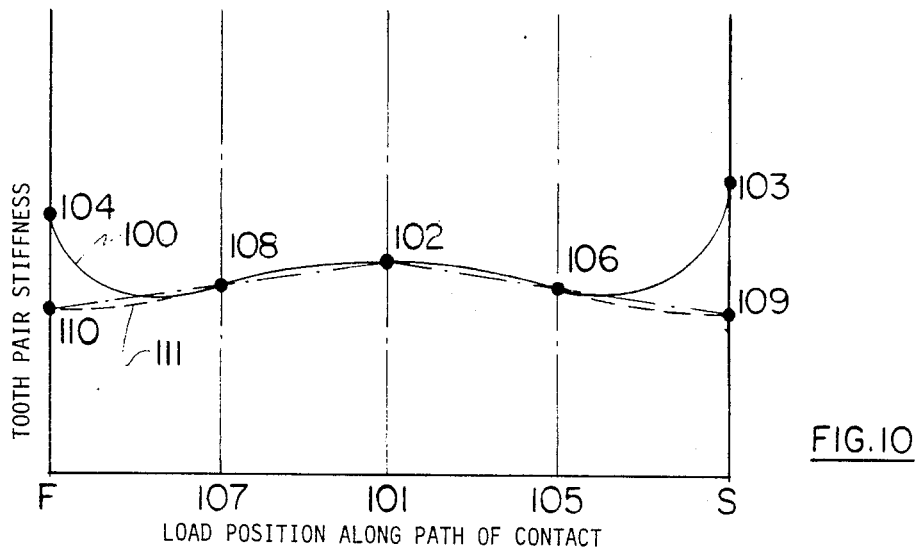
FIG. 10 is a graph that compares a tooth pair stiffness curve for a helical gear pair having standard 20°-involute teeth with that for teeth having an increased slenderness ratio.

A second way in which the tooth pair deflection curve 91 in FIG. 9 is unsatisfactory is that the teeth are too rigid with respect to loading at their tips as compared to loading at their pitch lines. This problem is illustrated in FIG. 10. In this figure the reciprocal of curve 91 in FIG. 9 is plotted, so that the ordinates, to an appropriate scale, measure tooth pair stiffness rather than tooth pair deflection. Curve 100 applies not only to the incremental strips of field (45, 46, in FIG. 4), but to a different ordinate scale the entire field 40 as well. If the length of the path of contact in this case is two base pitch lengths, then the maximum and minimum mesh stiffness values may be calculated from the ordinates of curve 100 at or near the quarter points. This is because the mesh stiffness curve must, because of symmetry, go through either a maximum or a minimum when lines of contact 21 either pass through the field centroid 29 or straddle it by one half a base pitch distance. Consequently the maximum mesh stiffness shown by the curve 100 will be the sum of ordinates 101–102 and the mean of ordinates S-103 and F-104 (since each of these end ordinates must be considered to be half in and half out of the field). The minimum mesh stiffness will be the sum of ordinates 105–106 and 107–108. If these ordinates are scaled and added, it will be found that the maximum mesh stiffness is approximately 30% larger than the minimum. Or, expressed in another way, the variation in mesh stiffness is about 13% of the mean mesh stiffness. This variation is slightly greater than that of most helical gear sets (except at low loads), but it is lower than the variations that occur in typical spur gear sets of conventional design; in either case, however, such variations constitute a major source of noise and vibrations in tooth gearing.

In order to eliminate the mesh stiffness variation associated with a tooth pair stiffness curve such as 100 in FIG. 10, two changes in the tooth characteristics must be made. Firstly, the mating teeth must be made equally stiff for tip loading, so that ordinates S-93 and F-97 in FIG. 9 will be equal, as well as their half-values S-92 and F-98; if this condition is fulfilled the stiffness ordinates S-103 and F-104 in FIG. 10, being the reciprocals of ordinates S-92 and F-98, will then also be equal. When the gear ratio is unity and both members of a gear pair have the same allowable stress, the teeth will generally have the same shapes and the critical ordinates S-103 and F-104 will then be equal. When the gear ratio is greater than unity, however, these ordinates will tend to be unequal unless special tooth characteristics are employed that keep them equal. If the gear is made of the same material as the pinion, for example, giving its teeth exactly the same flexibility as those of the pinion requires the use of either negative rack shift or generation with a different cutting tool, to make the gear teeth thinner (or in some cases slightly longer) than the pinion teeth.

The second modification that must be made in curve 100 of FIG. 10 is to reduce the end boundary ordinates (tooth pair stiffness for tip loading) 103, 104 to points 109 and 110 which not only have equal ordinates but also lie on straight lines 102–106 and 102–108 projects. This is achieved by substantially increasing the exponent of curve 63 in FIG. 9. Instead of the curve 63 shown, which is for standard 20°-involute teeth and is a parabolic curve of exponent slightly less than 2.0, the required curve is close to a cubic, so that points 93 and 97 will be almost twice as high as shown in FIG. 9, and points 109 and 110 in FIG. 10 (the reciprocals) will be correspondingly lowered.

This increase in the exponent of the tooth deflection curve is obtained by increasing the slenderness ratio, l/t (where l is as shown in FIG. 5 and t is the effective width of the tooth base). Most of the deflection of a tall, thin tooth is bending deflection (proportional to the cube of the slenderness ratio), while most of the deflection of a short, stubby tooth is shear deflection (proportional to the first power of the slenderness ratio). Consequently the necessary increase in the deflection curve exponent can be obtained by selecting the particular tooth features that will give the eact end boundary ordinates S-109 and F-110 shown in FIG. 10. Since the ordinates 105–106 and 107–108 are the mean of ordinates 101–102 and S-109 (or F-110), the maximum the minimum mesh stiffness for the set will be identical, and there will be no significant mesh stiffness variation as the contact lines 21 move across the field of contact 20 (or 40, for part load). Even the approximate methods described above will give a sum of the tooth pair stiffness ordinates for all positions of the contact lines in the field that is constant within 10%, and more careful deflection analysis or designs based on actual deflection tests will limit the variations in this sum to less than 5%, and in some cases less than 3%.

Figure 11:
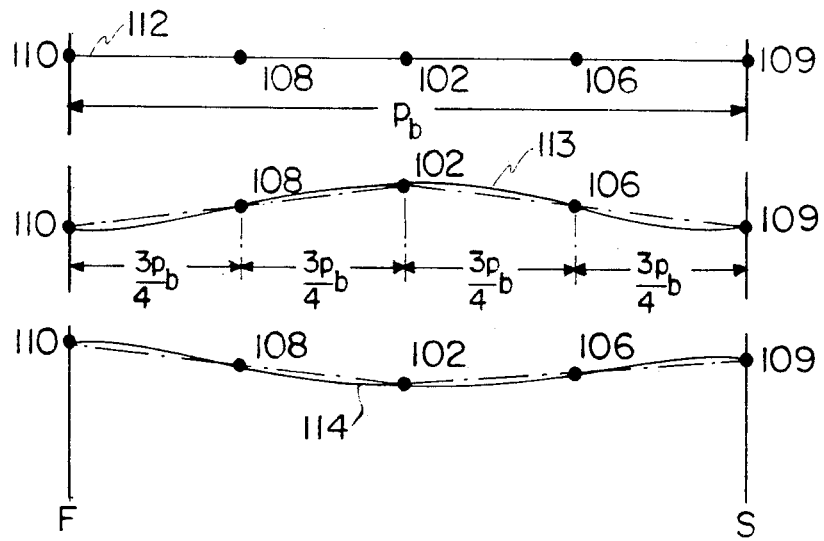
FIG. 11 shows tooth pair stiffness curves that are alternatives to those of FIG. 10.

FIG. 11 shows three alternatives to the tooth pair stiffness curve 111 shown in FIG. 10, adapted to different integral profile contact ratios. Curve 112 is simply a straight line, which is the tooth pair stiffness curve that must be obtained if the contact ratio is unity. For this case there is no way the sum of the tooth pair stiffness ordinates can remain constant unless the single ordinate itself remains constant. It should be noted, however, that this constant mesh stiffness curve requires special provision to raise the mesh stiffness at the quarter points (108 and 106) to maintain the straight line relationship. There are three expedients that may be employed to raise the quarter points 108 and 106 above the positions shown in FIG. 10. These are (1) increasing the helix angle, (2) using a narrow face width so the buttressing effect extends to the quarter points, or (3) curving the path of contact so that the effective lengths $l_1$ and $l_2$ in FIG. 5 are shortened at the quarter points.

The middle curve 113 in FIG. 11 shows a tooth pair stiffness curve similar to that of curve 111 in FIG. 10, but with greater variation. This is the type of stiffness curve that is obtained if the profile contact ratio is three. The principal difference from the curve 111 of FIG. 10 is that the quarter points 108 and 106, which are still the precision points used to insure that the maximum and minimum mesh stiffness conditions are identical, are spaced at three-fourths of a transverse base pitch distance from the end boundaries rather than one half as in the case of FIG. 10.

The third mesh stiffness curve shown in FIG. 11 (114) is one that can be obtained if the features that produce the curve 112 are carried to an extreme. It is not a desirable curve, however, because the tooth pair stiffness at the end boundaries is greater than at the center of the field of contact. Because tooth load is directly proportional to tooth pair stiffness, the curve 114 produces a load distribution that will induce very high bending stresses in the teeth at the start (S) and finish (F) of tooth contact.

It will be evident from the foregoing discussion of FIGS. 10 and 11 that to design gears that embody the invention, close control must be exercised over the flexibility of the teeth of both the pinion and the gear. The main features that influence tooth flexibility are whole depth, pressure angle, tooth number, and tooth thickness. The last of these is greatly affected by the depth of tooth generation, or what is called "rack shift." Referring to FIG. 12, it will be seen that a "positive rack shift," which is achieved by retracting the hob, produces a tooth form 121 that has a much wider base than a standard 20°-involute tooth form 122. Similarly, if the hob is advanced into the workpiece ("negative rack shift"), the tooth generated 123 has a narrower base than the standard tooth 122. As noted above, tooth deflection varies inversely as an exponential power of tooth base thickness, so the deflection of tooth form 121 in response to a load on its tip will be much smaller, and that of tooth form 123 much greater, than that of tooth from 122. Because the tooth pair stiffness at the start of contact (S in FIG. 6) is governed mainly by the gear tooth stiffness, it is evident that the ordinate of any point such as 103 in FIG. 10 will be increased (i.e., deflection increased) by negative rack shift and, conversely, decreased by positive rack shift.

The present specification will now deal with several special gear forms that embody the invention. FIG. 13 shows a geometrical construction intended as an aid to understanding how the invention is applied to a system of gearing that is interchangeable not only with regard to conjugacy but also with respect to tooth flexibility. Gear pairs machined by separate hobs may easily be given equal flexibility if the hob for the gear is shaped to machine a tooth that is thinner or deeper (or both) than the teeth on the pinion. In the case of stock gearing, however, all gear must not only mate with all other gears of the system, but must, according to the invention, have the same tooth flexibility and the same path length (of an integral number of transverse base pitch lengths). Prior art interchangeable gear forms have had the limitation of having teeth that are much stiffer when the number of teeth is large, because large diameter generating pitch circles reduce the amount of trochoidal scouring at the tooth root and therefore increase the width of the tooth bases, as noted in connection with FIG. 12. To offset this effect, but still be machinable by a common hob, an interchangeable gear system embodying the present invention can be achieved in the following manner.

The system employs a "basic pinion" that usually has fewer than 30 teeth and has the particular tooth proportions that afford a straight path SP in FIG. 13 that is on a line $I_1SP$ tangent to the pinion base circle 131 at the interference point $I_1$. To avoid an operating point at which the minimum radius of profile curvature $I_1S$ of the pinion teeth is so short that (a) Hertzian stresses are excessive and (b) small manufacturing errors cause major deviations from the Law of Gearing, the distance $I_1S$ is made preferably at least 0.3 modules and if possible 0.5 modules or more. This "basic pinion" is the smallest pinion that could be used as one of a mating pair and has a nominal pressure angle $\phi$ such that the generating pitch point P is halfway between the path ends S and F. The active portion of the basic rack for all gears of the system is shown as the broken line Sf, where the broken line Ff is perpendicular to a radial line from the center of the pinion through the generating pitch point P.

A mating gear will have a base circle 132 that has a base radius $R_{b2}$ equal to or in most cases larger than the base radius $R_{b1}$ of the pinion, by the ratio of tooth numbers. In the prior art interchangeable gear systems, this base circle 132 would be centered at $O_2$ and the operating pressure angle of the set would be the same as the generating pressure angle $\phi$ for pinion. For gear sets embodying the invention, the flexibility of the teeth of the mating gear must be increased by generating it with negative rack shift of amounts that increase with the number of teeth, but in all cases such rack shift must be sufficient to reduce the flexibility of the gear teeth to the same value as that of the pinion teeth in order to give tooth pair stiffness curves such as those plotted in FIGS. 10 and 11 (curves 111, 112, 113, 114).

This generation with negative rack shift would normally tend to produce excessive backlash, such as that shown in FIG. 7 of U.S. Pat. No. 1,525,642. To avoid this, the center $O_2$ of the gear is pushed toward that of the pinion $0_1$, by an amount approximately equal to the rack shift. That is to say, the set is operated on close centers $O_1, O_2'$ instead of standard centers $O_1, O_2$, and the operating pressure angle $\phi'$ will be the angle whose tangent is the sum of $I_2'F$, SF, and $I_1S$, divided by the sum of the base radii $R_{b1}$ and $R_{b2}$. The operating pitch point will move to P', and the operating center-distance will be the sum of the base radii $R_{b1}$ and $R_{b2}$ divided by the cosine of the operating transverse pressure angle $\phi'$. The result is a system of interchangeable gears for which the operating pitch radius of each gear varies depending on the number of teeth on the mating gear. The operating transverse pressure angle $\phi'$ may typically decline from somewhat less than 20° when the gear ratio is unity to values substantially smaller than $14\frac{1}{2}°$ when the gear ratio is three or more.

FIGS. 14 and 15 show how the invention may be applied to spur gears. In order to obtain a tooth pair stiffness curve such as shown as line 111 in FIG. 10, a buttress effect such as described above is needed, and in spur gearing this requires that the rectangular field of contact 20 of FIG. 2 be changed to a parallelogram 140. As in the case of the field 20 of FIG. 2, optimum distribution of the stiffening effects of buttressing in the direction of the quarter points (106, 108 in FIG. 10) requires that the outermost contact lines 141 intersect the end boundaries at an angle that is greater than 5° and preferably greater than 10°. The various features shown in FIG. 14 correspond to those of FIG. 2 but each carries an identifying number that is exactly 120 higher. As in the case of the field 20 of FIG. 2, the transverse length of the field 140 shown is three base pitch lengths $p_b$, which indicates the profile contact ration is substantially three and the tooth profiles will therefore usually be of the M-C form described in the prior art patents listed below. If the profile contact ratio is substantially unity or two, the preferred tooth profile will be an unmodified involute profile.

FIG. 15 is a partial section in the jogged direction shown as 15—15 in FIG. 1, indicating one method of causing the end boundaries 147, 148 in FIG. 14 to meet the adjacent load lines 141 at an angle. To produce the straight end boundaries 143, 144 of field 140 in FIG. 14, the addendum surfaces of the teeth 11 on the pinion 12 and the mating teeth 13 and on the gear 14 are made frusto-conical. If instead of the straight end boundaries 143, 144 in FIG. 14 it is desired to produce S-curve boundaries, then the straight conical elements 151–152 and 153–154 shown in FIG. 15 would have to be changed to slightly S-curved elements. In either case the tooth addendum heights will vary in the axial direction.

It will be evident that if it is desired to give the pinion 12 and gear 14 a cylindrical rather than a frusto-conical form, an alternative to the configuration shown in FIG. 15 would be to machine on the teeth 11, 13 a triangular or close-to-triangular tip relief area such that tooth portions outside the lines 151–152 and 153–154 (or their S-shaped equivalents) do not make contact with the mating tooth even at full torque.

Figure 17:
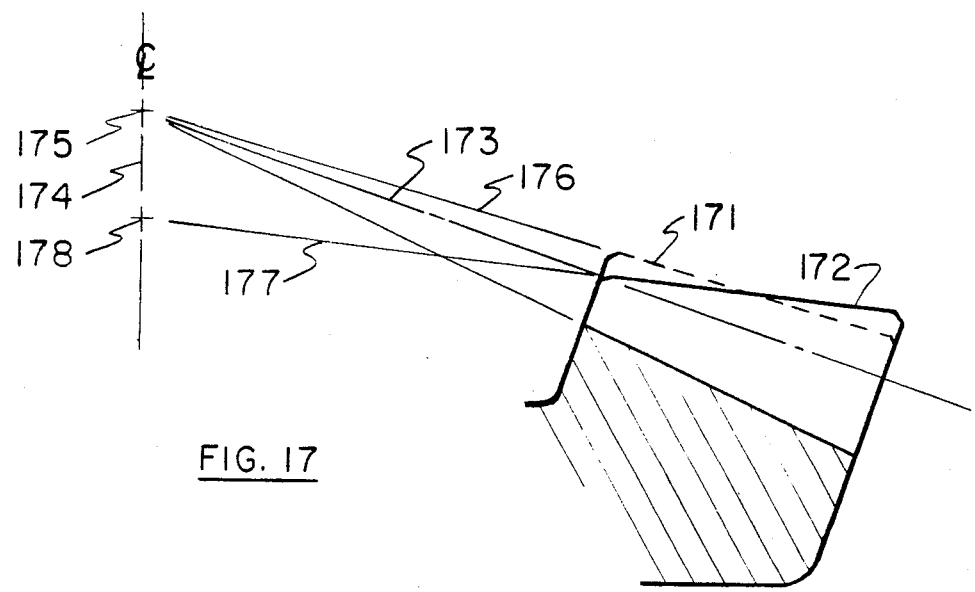
FIG. 17 is a partial section of a straight bevel gear taken in the tangential direction and showing the comparative silhouettes of a conventional tooth (broken lines) and a straight bevel gear tooth embodying the invention (solid lines).

As noted above, the most important difference in applications of the invention to straight or spiral bevel gears is that the base pitch of the gear set is an arc length that increases in proportion to the distance from the intersection point of the gear axes. This causes the field of contact or the developed field of contact 160 shown in FIG. 16 to be a partial sector of a circle, the end boundaries 164 of which are at an angle to the transverse direction (shown by the arrow). As in the field for the spur gears shown in FIG. 2, the end boundaries 163, 164 are identical straight lines, although flat S-curves spaced apart in the transverse direction by an integral number of base pitch arc lengths are of course feasible. In either case, the addendum surfaces of the gears will not coincide with the frusto-conical surfaces that have their apex at the intersection point of the gear axes, as shown in FIG. 17 and explained below. The tooth contact lines 161 are radial and are shown in the particular position in which one of them coincides with the centerline 162 of the field 160; as in the case of spur gears, the field of contact for a set of straight bevel gears usually contains the common pitch element, so the lines of contact will always pass through a position in which they are colinear with the common pitch element.

FIG. 17 shows the difference between the silhouette of a conventional straight bevel gear tooth 171 and one 172 that is shaped to produce the kind of skewed field of contact shown in FIG. 16 (160). In conventional straight bevel gears the common pitch element 173 intersects the gear axis 174 at a point 175 toward which all elements of the tooth surfaces converge including elements such as 176 that lie in the addendum surface. In the case of straight bevel gears embodying the present invention, the addendum heights at one end of the tooth are reduced and those at the other end are increased, so that the frusto-conical addendum surface is composed of elements 177 that converge on a point such as 178 that is closer to the gear than apex point 175 for one of a mating pair and further from the gear for the other (not shown). As a result the cone angle (i.e., the acute angle between axis 174 and element 177) is different from the cone angle between axis 174 and element 176 for a conventional bevel gear, being larger for the gear shown and smaller for its mate. It will be evident that it is the displacement of apex point 178 from apex point 175 combined with a similar but opposite displacement for the mating gear that produce the skewing of the field of contact 160 in FIG. 16.

Figure 18:
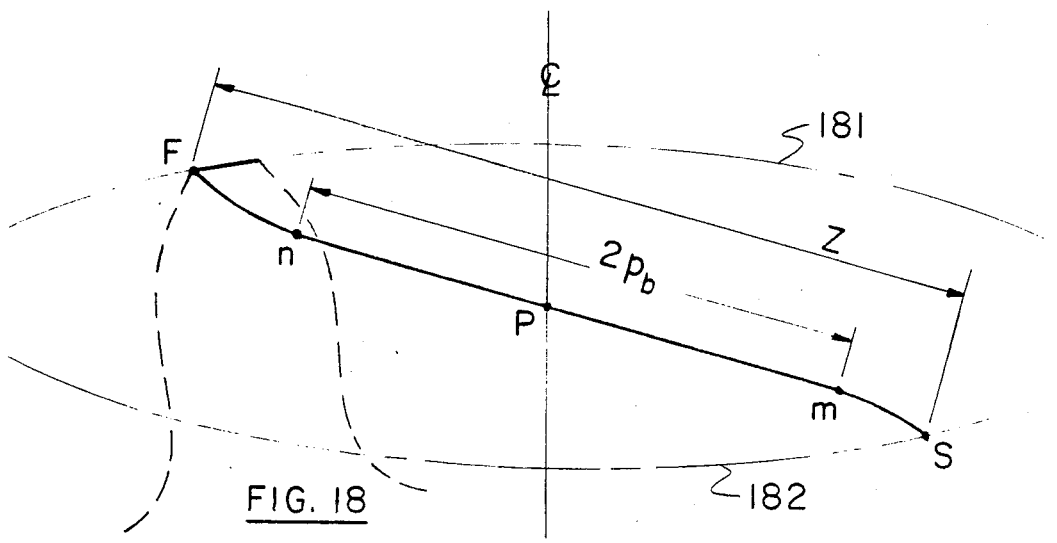
FIG. 18 is a diagram of the transverse plane area lying between the addendum circles of a pair of mating gears having teeth that make contact along a transverse path of contact that includes at least one curved segment.

FIG. 18 is a diagram of the transverse area between the pinion addendum circle 181 and the gear addendum circle 182, showing a path of contact S-m-P-n-F that is an alternative to the straight path 15 shown in FIG. 1. (The scale of the diagram is slightly larger than that of FIG. 1 but the views are otherwise analogous.) Many combinations of all-curved or curved-plus-straight portions are possible in this type of path, which is used in the "M-C" or "wide-angle" gearing mentioned below. In the particular embodiment illustrated in FIG. 18, the straight portion of the path m-n has an operating length of two base pitch lengths. The additional path segments m-S and n-F extend beyond the involute interference locus circle (not shown), so in order to avoid tooth flank cusping they must be curved in the manner called for in U.S. Pat. No. 4,276,785.

A number of observations may be made with respect to the foregoing specification: (1) The teeth shown in profile in FIG. 1 may be tapered slightly in the lengthwise direction, as proposed in U.S. Pat. No. 3,192,786. This affords a reverse gear train that not only locks into position but is also very quiet. (2) If it is desired to reduce the maximum bending stress of the teeth shown in FIG. 15, the gears may be given a dedendum that varies in depth as a result of being generated by a hob that has teeth of varying addendum and is shifted axially as it is fed across the work piece. (3) Increased tooth flexibility is characteristic of gear sets embodying the invention. In general it will therefore be desirable that the deepest portion of the teeth of at least one of the mating pair have a whole depth of at least 2.4 modules and preferably 2.8 modules. In some sets this whole depth may even be greater than 3.1 modules. (4) The present invention can be applied to all types of gearing that (a) can be given an integral contact ratio in the direction of motion of the driver, and (b) can be provided with tooth buttressing at the end boundaries of the field in order to lower curve 100 in FIG. 10 to the position of curve 111, such buttressing in all cases requiring that the tooth contact lines intersect the end boundaries of the field at an angle. Although gear designs for which the integral profile contact ratios are one or four are feasible, the most useful contact ratios are two and three. The profile contact ratio of two is used in applying the invention to what is called "High Contact Ratio" (HCR) gearing, invented by Cox in 1922 (U.S. Pat. Nos. 1,525,642 and 1,825,621), while the profile contact ratio of three is used in applying the invention to "Maximum Conjugacy" (M-C) or "wide angle" gearing U.S. Pat. Nos. 4,276,785 and 4,589,300 and U.S. patent application Ser. No. 757,350; "wide-angle" gearing differs from standard involute gearing in having a path portion that lies outside the involute interference point locus circles of both members of gear pair. (5) Factors used to advantage in gear teeth described in U.S. Pat. No. 4,276,785 will generally be equally advantageous in the gearing herein disclosed, such as the use of an intermediate radius interposed between the active tooth flank and the root radius generated by the hob tip radius. (6) Gear sets may be designed that have contact paths that have two transverse base pitch lengths of straight segment with an additional transverse base pitch length of slightly curved path length at one end or divided between both ends of the straight portions, to carry overloads. (7) There are two expedients that may be employed in applications where it is desired to reduce the mesh stiffness variation to less than three percent; these are (a) the use of small variations in the shape of the path of contact, generally in the direction of minor deviations from straightness, and (b) the use of special inflected crown shapes that produce jerk-free tooth engagement, especially for applications that transmit a constant torque. (8) Because the contact lines of helical and spiral bevel gears are oblique to the common pitch element, their position in the field of contact must be defined with respect to a point on a particular path line. In the case of FIGS. 9, 10 and 11 and the following claims, the reference path line is one that is midway between the side boundaries of the field.

In the foregoing specification and the ensuing claims the following terms are intended to have the following meanings: "effective addendum surface" means the area locus of the outermost boundary of the active tooth profiles, and does not encompass the volume swept out by the tooth tip chamfers or excessively relieved tooth portions that do not make contact even at full torque; "transverse plane" is a plane perpendicular to the pitch surfaces of a gear set; "transverse contact ratio" is the same as the "profile contact ratio" and is the operating length Z of the path divided by the transverse base pitch $p_b$; "common pitch element" is the line at which the pitch surfaces of a pair of mating gears are tangent; "pressure angle" means the transverse path slope-angle at the operating pitch point; "axial direction" is the direction normal to the direction of motion; "mathmatically conjugate" means that the common normal to the transverse profiles at a given contact point passes through the operating pitch point, a characteristic that is not present in the tips or roots of gear teeth that are relieved; "whole depth" means the depth of the tooth in a direction normal to the pitch surface and is the difference between the radius of the active addendum surface and the radial distance from the gear axis to the deepest portion of the tooth root; "substantially the same" means the smaller is not less than ninety percent of the larger; "operating length" of a path line means its actual length in the transverse direction including corrections for elastic deflection of shafts and bearings and the take-up of bearing clearances and wear, which together may typically shorten the nominal path length by two to five percent, or, if either the pinion or gear shaft is especially limber or is cantilevered, the shortening of the nominal path length may be as much as eight or nine percent, depending on the magnitude of the transmitted torque; "effective width of the tooth base" means the width t of the tooth base in the normal plane at the points of tangency of the Lewis parabola in accordance with AGMA Standard 218.01; the width of the tooth base in the transverse plane will be $t/\cos \psi$, where $\psi$ is the helix or spiral angle, as indicated in FIG. 5; "central path line" means the path line that is midway between the side boundaries of the field of contact; since all production gears and gear housings are manufactured to certain tolerances, the dimensions that are to used to define all of the gear features referred to herein, including contact ratios, shall be the nominal dimensions, which in the case of dimensions listed on a working drawing is the mean value between the maximum and minimum allowable dimensions for each such feature or in the case of manufactured gears the average value of the dimension for a sufficient number of gears or housings to constitute a representative sample.

I claim:

1. A pair of mating gears having teeth that are formed to engage along contact lines that lie within a field of contact having two side boundaries spaced-apart in the axial direction and two end boundaries spaced-apart in the transverse direction,
   one of said end boundaries having a segment that meets one of said contact lines and makes an acute angle with it greater than 5°,
   opposed transverse profiles of said teeth contacting each other at contact points on path lines lying in said field at a uniform distance from one of said side boundaries,
   the ratio of the operating length of said path lines to the transverse base pitch of said pair being within 0.15 of an integer,
   the tooth pair stiffness of said teeth when engaged at the midpoint of the central path line of said field added to the average of that at the ends of said central path line comprising a first sum,
   the tooth pair stiffness of said teeth when engaged at one of the quarter points of said central path line added to that at the other of the quarter points of said central path line comprising a second sum,
   each of said sums being within ten percent of the mean of said sums.

2. A pair of mating gears according to claim 1 wherein said angle is greater than 10°.

3. A pair of mating gears according to claim 1 wherein the whole depth of the teeth on one of said pair is greater than 2.4 modules.

4. A pair of mating gears according to claim 1 wherein the whole depth of the teeth of one of said pair is greater than 2.8 modules.

5. A pair of mating gears according to claim 1 wherein the whole depth of the teeth of one of said pair is greater than 3.1 modules.

6. A pair of mating gears according to claim 1 wherein said positions include a position in which one of said contact lines is colinear with the common pitch element of said pair.

7. A pair of mating gears according to claim 1 wherein said gears have axes that are parallel and the radius of the effective addendum surface of at least one of said pair varies in the axial direction.

8. A pair of mating gears according to claim 1 wherein said gears have axes that intersect at a point and the effective addendum surface of at least one of said pair includes portions that are not contained in a frusto-conical surface having said point as its apex.

9. A pair of mating gears according to claim 1 wherein said teeth on one of said pair are crowned in their lengthwise direction.

10. A pair of mating gears according to claim 1 wherein said teeth have profiles in the transverse direction that are mathematically conjugate along substantially the entire length of said path line.

11. A pair of mating gears according to claim 1 wherein said gears have axes that are parallel and said teeth are tapered in their lengthwise direction, 12. A pair of mating gears according to claim 1 wherein said path lines are non-straight.

13. A pair of mating gears according to claim 1 wherein said path lines include a portion lying outside both interference point locus circles for said pair.

14. A pair of mating gears according to claim 1 wherein the active tooth profiles of said teeth in the transverse direction are unmodified involute curves.

15. A pair of mating gears according to claim 1 wherein the operating transverse pressure angle is smaller than 20°.

16. A pair of mating gears according to claim 1 wherein the operating transverse pressure angle is smaller than 14½°.

17. A pair of mating gears according to claim 1 wherein said path lines have a straight portion and a non-straight portion, the ratio of the operating length of said straight portion to the transverse base pitch of said pair being substantially equal to an integer.

18. A pair of mating gears according to claim 1 wherein the tooth pair stiffness at one of said end boundaries is substantially the same as that at the other of said end boundaries.

19. A pair of mating gears according to claim 1 wherein the thickness of the teeth of one of said pair is different from that of the other of said pair.

20. A pair of mating gears according to claim 1 wherein the gear ratio is greater than unity and the addendum and dedendum coefficients of each of said pair are proportioned to produce a tooth pair stiffness that is substantially the same at both end boundaries of said field of contact.

21. A pair of mating gears according to claim 1 wherein the tooth pair stiffness at a transverse distance of one half a transverse base pitch from one of said end boundaries is intermediate between the tooth pair stiffness at said one of said boundaries and that at a transverse distance therefrom of one transverse base pitch.

22. A pair of mating gears according to claim 1 wherein said teeth have unrelieved transverse profiles and the tooth pair stiffness at said end boundaries is less than that halfway between said end boundaries.

23. A pair of mating gears according to claim 1 wherein the number of teeth on one of said pair is greater than that on the other of said pair.

24. A pair of mating gears according to claim 1 wherein one of said profiles is conjugate to a basic rack which has adjacent to its tip radius a segment with a radius larger than said tip radius and smaller than the basic rack segment that generates the innermost active portion of said one of said profiles.

25. A pair of mating gears according to claim 1 wherein one of said pair has fewer than 30 teeth.

26. A pair of mating gears according to claim 1 wherein no point on said path of contact is closer than 0.3 modules to the base circle interference point of either of said gears.

27. A pair of mating gears according to claim 1 wherein the profile contact ratio is larger than the face contact ratio.

28. A pair of mating gears according to claim 1 wherein each of said sums is within five percent of the mean of said sums.

29. A pair of mating gears according to claim 1 wherein each of said sums is within three percent of the mean of said sums.

30. A pair of mating gears according to claim 1 wherein said ratio is within 0.10 of an integer.

* * * * *